(12) United States Patent
Sinn

(10) Patent No.: US 10,773,588 B2
(45) Date of Patent: Sep. 15, 2020

(54) AIR VALVE DEVICE WITH AIR VALVE ADJUSTMENT BASED ON A DETERMINED COLLISION HAZARD

(71) Applicant: Röchling Automotive SE & Co. KG, Mannheim (DE)

(72) Inventor: Daniel Sinn, Damme (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 227 days.

(21) Appl. No.: 15/874,946

(22) Filed: Jan. 19, 2018

(65) Prior Publication Data

US 2018/0208050 A1    Jul. 26, 2018

(30) Foreign Application Priority Data

Jan. 20, 2017    (DE) .................... 10 2017 200 967

(51) Int. Cl.
*B60K 11/08*    (2006.01)
(52) U.S. Cl.
CPC ......... *B60K 11/085* (2013.01); *B60Y 2306/01* (2013.01); *Y02T 10/88* (2013.01)
(58) Field of Classification Search
CPC .... B60K 11/085; B60Y 2306/01; Y02T 10/88
See application file for complete search history.

(56) References Cited

U.S. PATENT DOCUMENTS

| | | | |
|---|---|---|---|
| 6,516,258 B1 | 2/2003 | Hermann | |
| 6,907,335 B2 | 6/2005 | Oswald | |
| 7,109,854 B2 | 9/2006 | Dobler | |
| 8,606,466 B2 | 10/2013 | Schoerrig | |
| 9,950,610 B2 * | 4/2018 | Kaneko | B60K 11/04 |
| 2012/0019025 A1 | 1/2012 | Evans | |
| 2013/0126253 A1 * | 5/2013 | Saito | B60K 11/085 |
| | | | 180/68.1 |
| 2013/0248266 A1 * | 9/2013 | Asano | B60K 11/04 |
| | | | 180/68.1 |
| 2015/0321547 A1 | 12/2015 | Pickl | |

(Continued)

*Primary Examiner* — Hussein Elchanti
(74) *Attorney, Agent, or Firm* — Prince Lobel Tye LLP

(57) ABSTRACT

An air valve device for a motor vehicle comprises an air valve support with a flow opening and has at least one air valve extending into or passing through the flow opening, which is movably seated on the air valve support between a blocking position as one working position, and a flow position as another working position, wherein the air valve in the blocking position provides a greater resistance to a particular flow through the flow opening than in the flow position. A drive device is connected to the at least one air valve for movement between its working positions at least temporarily in a drive force transmitting manner. A control device actuates the drive device. A collision prediction device is designed when in the final state mounted on a motor vehicle, to monitor a monitored zone located in front of the vehicle and to assess the danger of collision, wherein the collision prediction device, is coupled to the control device so as to transmit a signal, and wherein the control device is designed to actuate the drive device to cause the movement of the at least one air valve into a predetermined target position range when the collision prediction device emits a signal which indicates that the danger of a collision is high.

14 Claims, 4 Drawing Sheets

(56) References Cited

U.S. PATENT DOCUMENTS

2018/0304843 A1\* 10/2018 Vacca ................. B60K 11/085
2019/0080313 A1\* 3/2019 Van Wiemeersch .........................
                                                           H04W 4/023

\* cited by examiner

AIR VALVE DEVICE WITH AIR VALVE ADJUSTMENT BASED ON A DETERMINED COLLISION HAZARD

CROSS-REFERENCE TO RELATED APPLICATIONS

This application claims priority to application number DE 10 2017 200 967.5 filed Jan. 20, 2017, the entire contents of which are incorporated herein by reference.

BACKGROUND

The present invention relates to an air valve device for a motor vehicle, comprising an air valve support with a flow opening and with at least one air valve extending into or passing through the flow opening, and which is movably seated on the air valve support between a blocking position as one working position, and a flow position as another working position, wherein the air valve in the blocking position provides a greater resistance to a particular flow through the flow opening than in the flow position, wherein the air valve device further comprises a drive device which is connected to the at least one air valve as movement drive for movement between its working positions at least temporarily in a drive force transmitting manner, and wherein the air valve device features a control device to actuate the drive device.

An air valve device of this kind is generally known. They are normally located on the front side of motor vehicles in order to change the flow of air through the flow opening into the engine compartment during the forward movement of the motor vehicle. The passage of air through the flow opening is adjustable by movement of the air valves between their working positions, in particular as a function of the operating parameters of the vehicle.

In this way, by selecting the working position of the air valves, the convective cooling of the functional aggregates of the motor vehicle located in the direction of flow behind the flow opening can be changed. By operation of the motor vehicle after a cold start with the air valves in the blocking position, for example, a convective cooling of the internal combustion engine in the engine compartment of the motor vehicle can be prevented or restricted, so that it can warm up more quickly to its rated operating temperature, in which it emits less pollution compared to the transient, cold-start state. To protect against overheating of the internal combustion engine, the air valves can be adjusted into the flow position, so that the internal combustion engine or other functional aggregates of the motor vehicle can be cooled by convection by the air flowing through the flow opening.

Air valves are often located around a pivot axis positioned in parallel to their longitudinal axis so as to pivot on the air valve support. The air valves are then designed as large-area components having their greatest dimension along the pivot axis and having their minimum dimension as a thickness dimension orthogonal to the pivot axis.

An additional dimension, the width dimension, which proceeds both orthogonal to the thickness dimension and also orthogonal to the longitudinal dimension, denotes the spacing between the two longitudinal edges of the air valve. Vehicle manufacturers usually endeavor to change the effective flow cross-section of a particular flow opening with as few air valves as possible, in order to obtain the largest possible flowable cross-section when the air valves are left in the flow position.

However, the smallest number of air valves means a large width of the air valves, due to the structure of the flow opening.

Even though the present invention pertains to the change of position of at least one air valve into a target position range predetermined to be less potentially harmful in an assumed collision event, for the purpose of a simplified explanation, quadrilateral air valves are assumed whose thickness is much smaller than their width and in turn, their width is much smaller than their length. Using a simplified, but accurate assumption, the air valve is arranged with its longitudinal axis parallel to the lateral axis of its supporting vehicle and can pivot between its working positions about a pivot axis parallel to the vehicle lateral axis or to the air valve longitudinal axis. It is further assumed that the width direction of the air valve in its blocking position is oriented parallel to the vehicle yaw axis and in its flow position is parallel to the vehicle roll axis. Alternatively, the air valve—depending on vehicle type—can pivot around a pivot axis parallel to the vehicle yaw axis, and in turn, the air valve longitudinal axis is parallel to the pivot axis of the air valve. Then in the latter case, in contrast to the foregoing it is assumed that the width direction of the air valve in its blocking position is oriented parallel to the vehicle lateral axis and in its flow position is in turn parallel to the vehicle roll axis.

If the vehicle equipped with one such air valve device on its front side impacts frontally against an obstacle not extending across the entire width of the vehicle, such as against a person, a majority of the collision-related stress on the air valve is a flexural stress about a flexure axis parallel to the vehicle yaw axis.

The resistance that the at least one air valve applies against one such flexure, depends on its area moment of inertia. The area moment of inertia of a body with a square cross-section with height h and thickness d under a flexure about a lateral axis parallel to the thickness direction, is proportional to the product of the thickness times the third power of the height.

Then if the vehicle impacts frontally against a person with the at least one air valve in the flow position, as assumed in the above simplification, the lateral axis of the lateral stress of the air valve runs approximately in the thickness direction, so that the area moment of inertia of the air valve is proportional to the product of the thickness of the air valve and the third power of its width. In order to attain the most "flexural" and thus the least damaging impact of the air valve upon a person in the case of such a collision, it is thus advisable to reduce the width of the air valve since it is proportional to the third power of the flexural deformation resistance of the air valve. From this, a requirement is derived for the narrowest possible air valve and consequently also for the greatest possible number of air valves. An accident involving a person, and an injury to the person involved in an accident, are only one of many possibilities. The air valves oriented in the flow position with their width dimension essentially longitudinal to the vehicle roll axis, also represent an increased risk of damage, due to their large flexural resistance, to functional components located immediately behind them, such as a coolant heat exchanger.

There is thus, with a view toward the most effective convective cooling, a requirement that there be as few air valves as possible, which would be, however, as wide as possible and the opposing requirement for the least injurious, and thus the narrowest possible valves, which would then have to be provided in the largest possible number.

These diametrically opposed target requirements cannot be reconciled and cannot be realized simultaneously in one vehicle.

SUMMARY OF THE INVENTION

Therefore it is the object of the present invention to specify an air valve device of the kind described above which makes it possible to expose the largest possible cross-sectional area of the flow opening to a flow of cooling air, while nonetheless minimizing the risk of injury occurring due to the air valves in the event of a collision.

According to the invention, this problem is solved by a generic air valve device comprising a collision prediction device which is designed, in a completely mounted state on a motor vehicle, to monitor a monitored zone located in front of the vehicle and to assess the danger of collision, wherein the collision prediction device is coupled to the control device so as to transmit a signal, and wherein the control device is designed to actuate the drive device to cause the movement of the at least one air valve into a predetermined target position range when the collision prediction device emits a signal which indicates that the danger of a collision is high.

With the solution proposed according to the invention, the air valve device can be equipped with at least one large-area air valve, that is, with a large width air valve when the air valve length is specified by the flow opening, without this meaning an unnecessarily great danger of injury during operation of the vehicle. This is because if the collision prediction device predicts an immediately pending collision with an obstacle, the air valve can be adjusted into a target position range in which it poses only a small potential danger of injury, compared to a potential danger of injury at a great or maximum flexural resistance for the particularly relevant case of flexure about a lateral axis parallel to the vehicle yaw axis in case of a collision.

Collision prediction devices are generally known in motor vehicles. Firstly, collision prediction devices are in use in vehicles and are known as pre-crash devices in order to optimally prepare the passengers of the particular vehicle for a pending collision if this pending collision is recognized accordingly. Devices of this kind are known, for example, from DE 101 32 681 C1, from DE 10 2010 003 297 B4 or from DE 198 15 002 C2.

Likewise, collision prediction devices are known which relate to an assessment of the probability of a collision with pedestrians or with persons in general, from documents EP1 393 282 A, DE 10 2012 111 846 A1, DE 10 2014 205 202 A1, DE 10 2005 025 775 A1 or DE 197 29 960 A1, just to mention a few.

All these collision prediction devices essentially have in common that a monitoring zone in front of the vehicle carrying the collision prediction device is monitored by means of corresponding sensors and sensing devices, and a pending risk of collision is assessed on the basis of the monitoring result.

Due to the coupling with the control device of the air valve device for the transmission of signals, the collision prediction device can transfer the result of the detection or assessment with regard to a collision hazard in the monitored zone, so that the control device can directly actuate the drive device to move the at least one air valve into a predetermined target setting range, even before the potential collision occurs and a collision of the vehicle carrying the air valve device takes place against an obstacle, in particular with a pedestrian or with any person in general.

There are several possibilities for classifying the danger of a collision as high. For example, as a result of its sensor-based determination, the collision prediction device can output a signal value which is deemed to be "high" when it is greater than a predetermined, threshold value. Likewise, the collision prediction device can output one of three discrete values, so that a first value means a low risk of collision, a second value means a moderate risk of collision and a third value means a significant risk of collision. Then in anticipation of a collision, the control device of the air valve device can actuate the drive device to cause the movement of the at least one air valve into the target position range, when the value for a moderate or a significant collision risk is output, or only when the value for a significant collision risk is output.

The comparison operation of the signal output from the collision prediction device for determining of the collision risk can be carried out previously by the collision prediction device itself, or by the control device of the air valve device or by a higher-order vehicle control device.

In order to ensure that the at least one air valve is moved into the target position range as a function of the determined risk of collision, the actuation for movement into the target position range occurs independently of other parameters which might otherwise initiate the change in an air valve position. Then when the danger of a collision is still detected as being sufficiently great, the actuation of the drive device by the control device will proceed independently of other parameters affecting the position of the air valve in normal operation of the vehicle.

Thus according to the invention, flexible air valves are no longer provided, rather a very stiff air valve in a predetermined working position is moved into a target position before the occurrence of a collision, so that the valve will exhibit a lesser resistance to flexural deformation under the load anticipated in a collision.

This is generally the case when the target position range is located closer to the blocking position than to the flow position, wherein this is to be assessed independently of the arrangement of the air valve device on the vehicle, and need not necessarily be so in every case.

Preferably the target position range features only those positions which are located closer to the blocking position than to the flow position.

Quite in general, the target position range contains only those positions which display a lower resistance of flexural deformation occurring at a predetermined, collision-related stress than in the working position of the at least one air valve during the determination of a great danger of collision. Thus, a collision flexure axis is assigned to the theoretically assumed case of a collision, which can always be different from an actually occurring, non-predictable load event, but which is sufficiently reflected in this model.

As a rule, it can be assumed that the target position range includes the blocking position or is even limited to the blocking position, thus the at least one air valve is always moved from any particular operating position into the blocking position in anticipation of the pending collision.

It should be pointed out solely for the sake of completeness that according to one favorable embodiment of the present invention, the collision prediction device features at least one contactless sensing device for scanning the monitored zone, such as a radar, LIDAR and/or ultrasonic sensing device. However, the present invention does not relate to a collision prediction device, but rather to the derivation of preferably advantageous initiatives arising from its measured results. Collision prediction devices are inherently known and can be used as such in the present air valve device.

As a rule, an air valve device is used together with a collision prediction device in a vehicle. In line with the present application, an air valve device "comprises" a collision prediction device when the latter is connected directly or indirectly by means of additional control or other data processing devices to the control device of the air valve device so as to transmit signals, and that the detection results from the collision prediction device can be used by the control device of the air valve device to determine appropriate actions.

As a motion drive, the drive device can have a normal-operation motion drive unit which in the conventional driving mode of the vehicle carrying the air valve device ensures the proper movement of the at least one air valve between its operating positions. This can be, for example, an electric motor which is usually connected to the at least one air valve by the intermediate placement of a linkage or transmission so as to transmit power and/or torque. It would even be possible for the control device to actuate this normal mode drive unit to move the at least one air valve into the target position range.

In the case of an event recognized as an immediately pending collision, in order to move the at least one air valve as quickly as possible into the target position range, the control device can be designed such that the drive device, in particular the normal mode drive unit, causes the movement of at least one air valve into the predetermined target position range with an emergency-drive power when the collision prediction device emits a signal which indicates that the danger of a collision is high. This emergency power exceeds the rated drive power in a conventional operation (standard operation) of the air valve device. In this case, an overload of the drive device, even a self-destructive overload, can be accepted. Consequently, after the occurring collision, damage to or destruction of the air valve device or of the drive device will have to be considered likely. The emergency-drive power is preferably several times greater than the nominal-drive power, being three, four, or even more times greater. Thus, with a single motion drive, the at least one air valve can be caused to move in both normal mode and emergency mode if a collision is imminent.

Then, when the collision is imminent, the normal mode drive unit can be too slow or too sluggish to move the at least one air valve into the target position range in a timely manner before the occurrence of the anticipated collision.

Alternatively, the drive device can thus preferably feature an emergency mode drive unit that can be operated separately from the normal mode drive unit in order to move the at least one air valve only in an emergency operating situation. In this case the emergency mode drive unit is preferably designed such that the at least one air valve is accelerated faster than the normal mode drive unit and/or is accelerated to a greater maximum speed of movement. Then the air valve will be accelerated faster if it is accelerated at a greater acceleration value.

For example, the emergency mode drive unit can have a mechanical and/or pneumatic and/or hydraulic and/or pyrotechnic energy reservoir and an initiator for sudden transformation of the potential energy saved in the energy reservoir into motion energy of the at least one air valve. Then the control device will actuate preferably only the initiator in order to convert the potential energy stored in the energy reservoir in the shortest possible time, and thus to convert it suddenly into kinetic energy to adjust the at least one air valve into the target position range. For example, the actuator can be an igniter of the pyrotechnic energy reservoir or a valve of a pneumatic or hydraulic pressure reservoir or a retention device of a tensioned spring of a mechanical energy reservoir. Therefore the emergency mode drive unit can be a "one-time movement drive" which can be used just once and then has to be replaced or restored for renewed use. Conversely, the normal mode drive unit is a permanent movement drive.

The control device can actuate the normal mode drive unit or the emergency mode drive unit, depending on the result determined from monitoring by the collision prediction device with respect to the collision hazard, depending on whether the signal output from the collision prediction device indicates a danger value which exceeds a second threshold value and thus denotes a particularly high, imminent danger of collision.

According to another embodiment of the same invention idea, the problem stated above is also solved by a generic air valve device in which the control device is designed to receive signals from a collision prediction device, which is designed such that when it is in a completely mounted state in a motor vehicle, it monitors a monitored zone located in front of the vehicle and assesses the danger of collision, and then, based on the signals from the collision prediction device, the drive device is actuated to move the at least one air valve into a predetermined target position range when the signal from the collision prediction device indicates that the danger of a collision is high. This air valve arrangement, of which the collision prediction device is not a component, the collision prediction device being mentioned only in order to simplify the description of the valve, can also be advantageously improved, like the above-mentioned first air valve device, which solves the problem described above.

The present invention furthermore relates to a motor vehicle with an air valve device as is described and improved above, and with a vehicle control device which is connected to the control device of the air valve device so as to transmit signals, or which is the control device.

BRIEF DESCRIPTION OF THE DRAWINGS

The present invention will be explained in greater detail below based on the attached drawings. Represented are.

DETAILED DESCRIPTION

Figure 1:
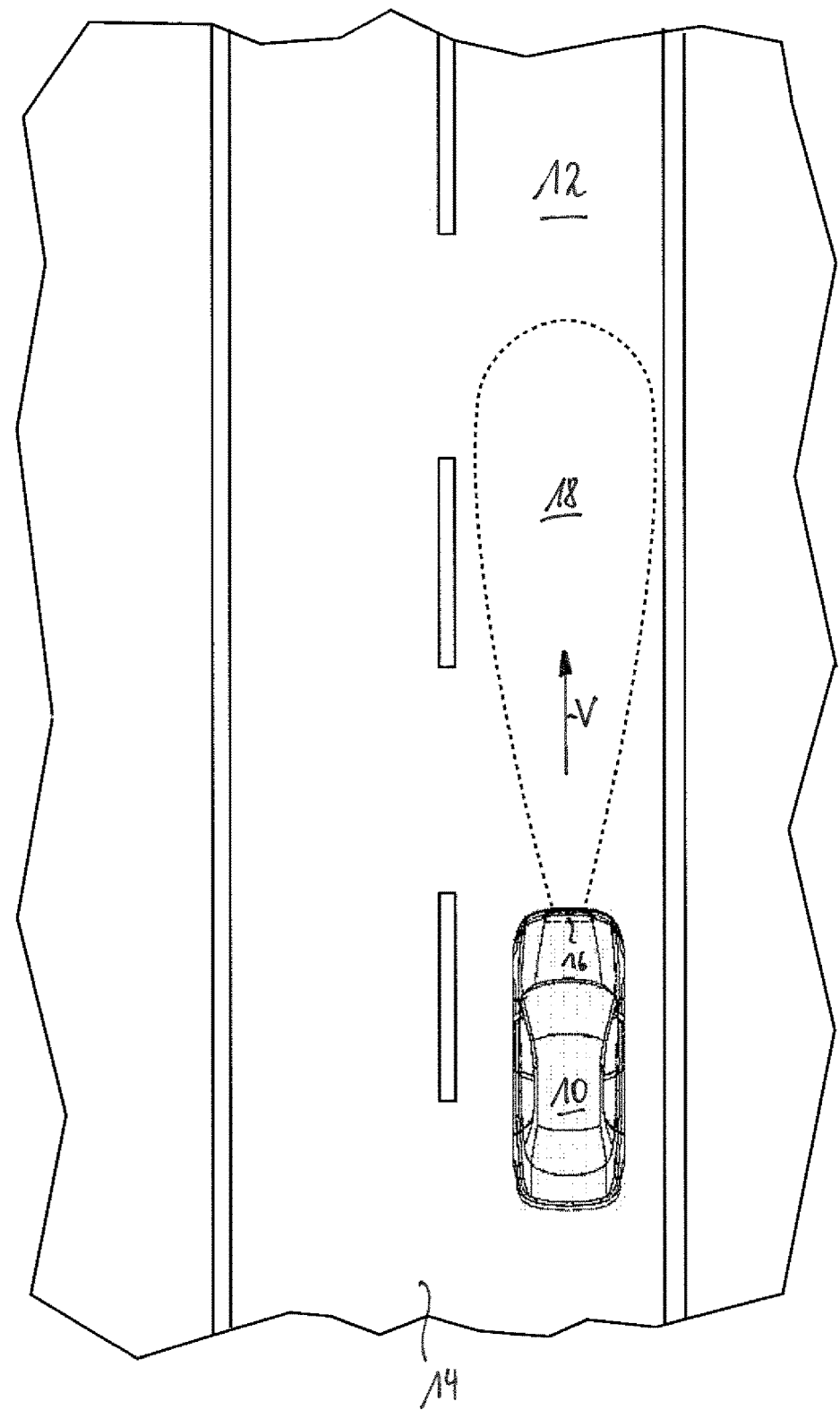
FIG. 1 a driving situation of a motor vehicle equipped with the air valve device according to the invention, FIG. 2 an inventive embodiment of an air valve device according to the present application in normal operation, with the air valves in the blocking position, FIG. 3 the inventive air valve device in FIG. 2 in normal operation with the air valves in the flow position

FIG. 1 shows a vehicle 10 is driving in its lane 12 of the road 14 in the forward direction V. A collision prediction device 16 monitors, perhaps by emitting electromagnetic and/or ultrasound waves and receiving any arriving echoes, a monitored zone 18 located in front of the motor vehicle 10 in the forward driving direction.

The collision prediction device 16 emits the said waves in a known manner, for example, and detects the reflected echo. Proceeding from the detected echo signals, an onboard computer as control device determines the danger of collision. Collision prediction devices are known from the prior art.

Figure 2:
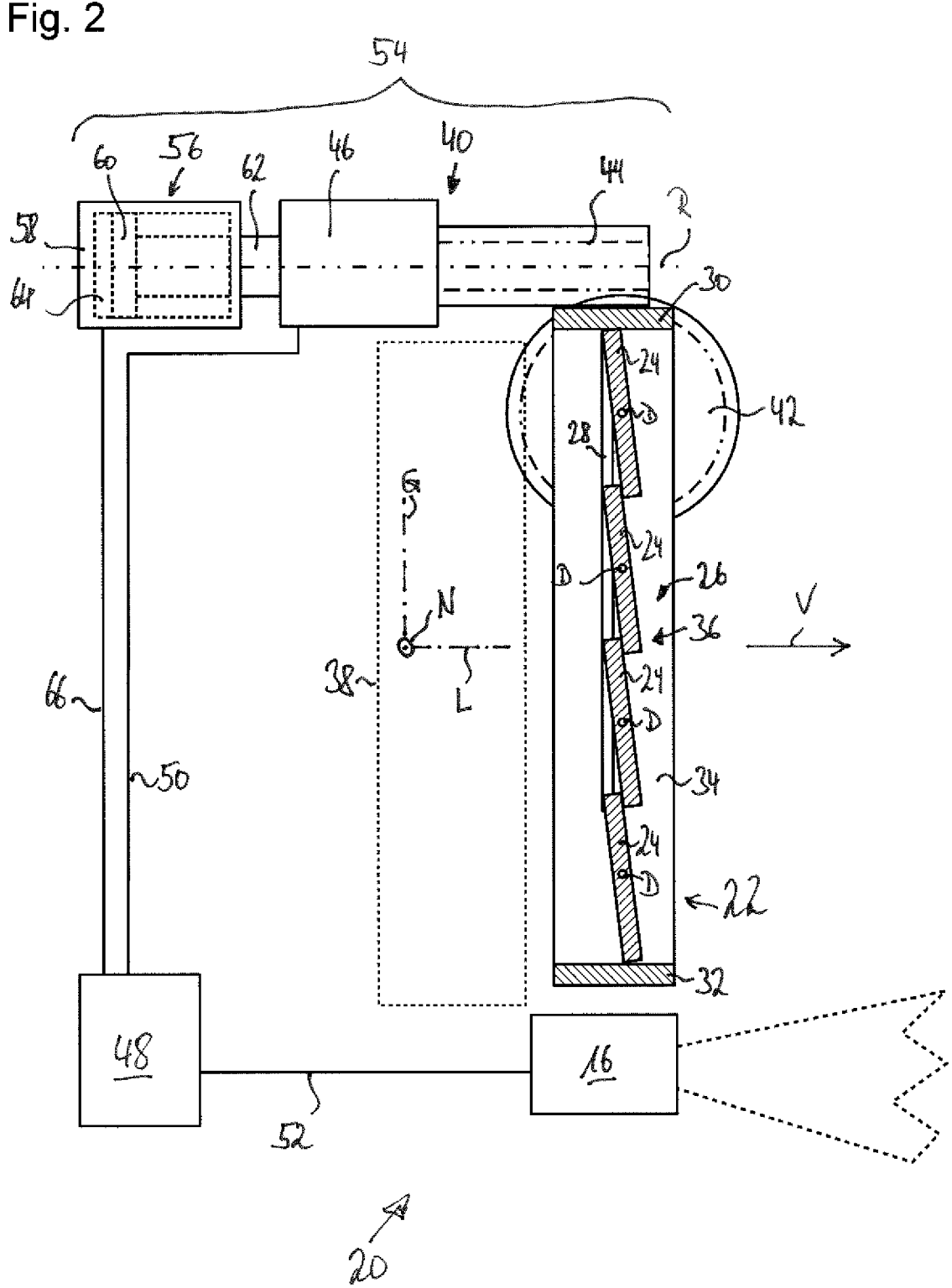

FIG. 2 depicts an air valve device according to the invention, designated generally by reference number 20. It comprises the already-mentioned collision prediction device 16, an air valve device 22 with four essentially equivalent air valves 24 which are seated on an air valve support 26 and pivot around mutually parallel axes of rotation D orthogonal to the drawing plane of FIG. 2. A connecting bar 28 symbolizes a connecting link which connects the air valves 24 to the common pivot motion about their particular rotation axes D.

The air valve support 26, of which an upper and a lower beam 30 or 32, and a vertical stmt 34 connecting the beams 30 and 32 located behind the drawing plane are depicted, surrounds a flow opening 36 which has air flowing onto and through it during the forward drive movement V of the vehicle 10 supporting the air valve device 20.

Figure 3:
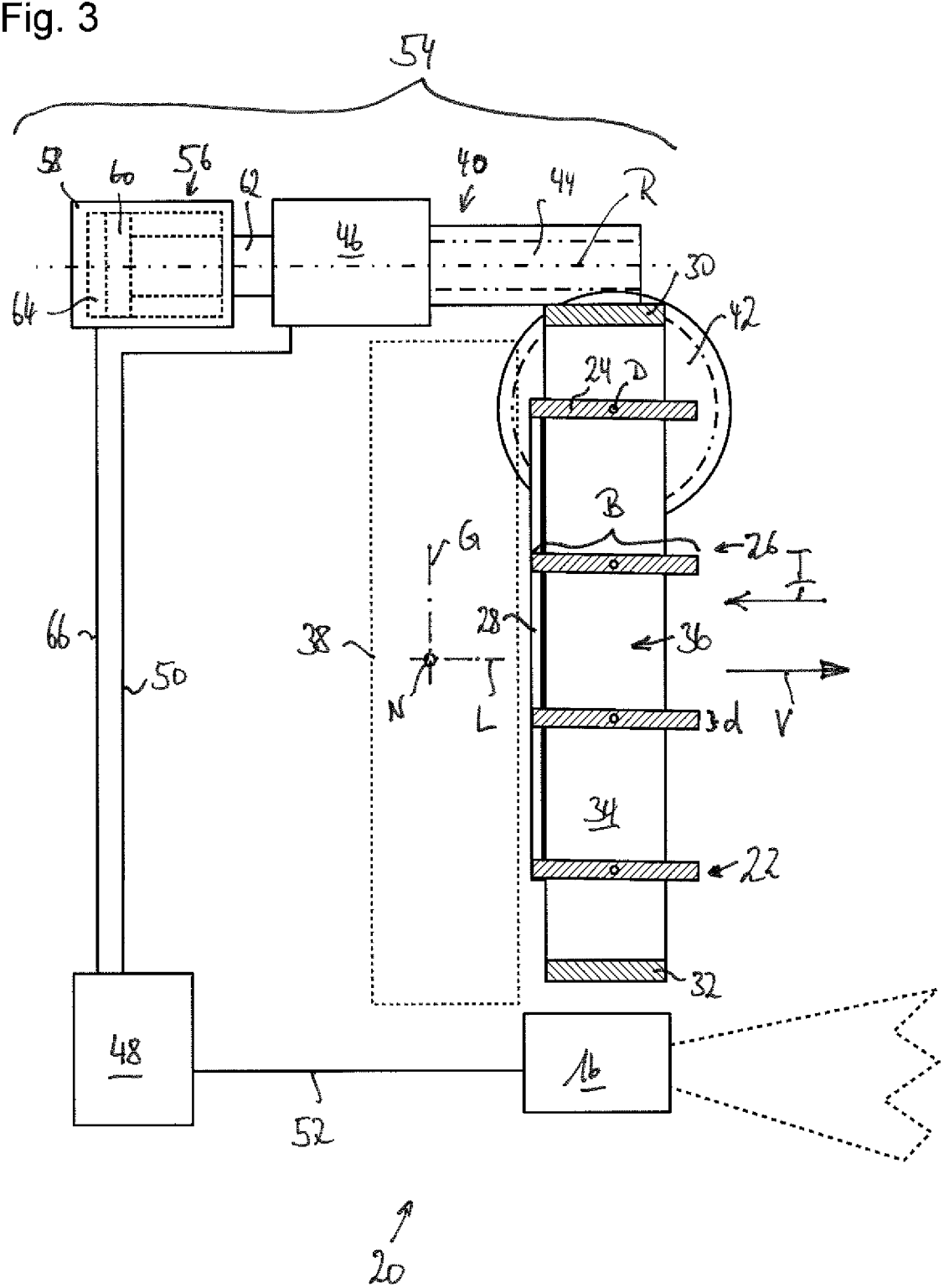

In FIGS. 2 and 3, the air valves 24 are in normal operation, that is, in the usual driving mode of the motor vehicle. In FIG. 2 the air valves 24 are in the blocking position in which they essentially close off the flow opening 36. During forward driving in this position, little or no driving wind is able to move through the flow opening 36, for example, to the cooling heat exchanger 38 located behind the air valves 24 and indicated by dashed lines for simplicity of illustration.

To adjust the air valves 24 in normal operating mode between the blocked position shown in FIG. 2 and the flow position shown in FIG. 3, the air valve device 20 features a normal mode drive unit 40 which in the illustrated embodiment appears as a worm drive in cooperation with a worm gear 42 non-rotatably connected to an air valve 24 rotating jointly around the axis of rotation D. The normal mode drive unit 40 features a worm 44 rotatable about an axis of rotation R, by which an electric motor 46 can be caused to rotate about the axis of rotation R. For operation, the electric motor 46 is powered by a control device 48, such as an onboard computer, which is connected not only to the electric motor 46 of the normal mode drive unit 40 by means of a line arrangement 50 for transmission of signals and energy, but rather is also connected to the collision prediction device 16 by a line arrangement 52.

By rotation of the worm 44 in one direction, the air valves 24 can be brought into an end position, for example the blocking position depicted in FIG. 2, in which an additional introduction of drive force leads to an increased stop current in the electric motor 46, which can be detected by the control device 48, whereupon the control device 48 switches off the motion drive because the target working position of the air valves 24 is detected.

Likewise, the worm 44 can be rotated in the opposite direction about the rotation axis R in order to move the air valves 24 into another, opposite end position, such as the flow position indicated in FIG. 3.

The drive device 54 can comprise not only the normal mode drive unit 40, but also an emergency mode drive unit 56. The emergency mode drive unit 56 is used to adjust the air valve device 26 in the shortest possible time into a predetermined target position, and only into this position.

In the illustrated exemplary embodiment to which the invented air valve device 10 is not intended to be limited, the emergency mode drive unit 56 is a pyrotechnic drive comprising a cylinder 58 with a movable piston 60 accommodated therein, which supports the normal mode drive unit 40 by means of a piston rod 62. Thus the normal mode drive unit 40 is seated indirectly via the emergency mode drive unit 56 on the vehicle frame or on a component securely connected to the frame, whereas the emergency mode drive unit 56 is connected directly to the vehicle frame or to a component directly connected to the frame.

An ignitable material is contained in an explosion chamber 64 formed between cylinder 58 and piston 60, like that known, for example, from the actuators of airbags. The ignitable material accommodated in the explosion chamber 64 is connected via a line arrangement 66 to the control device 48 and can be ignited by it.

Figure 4:
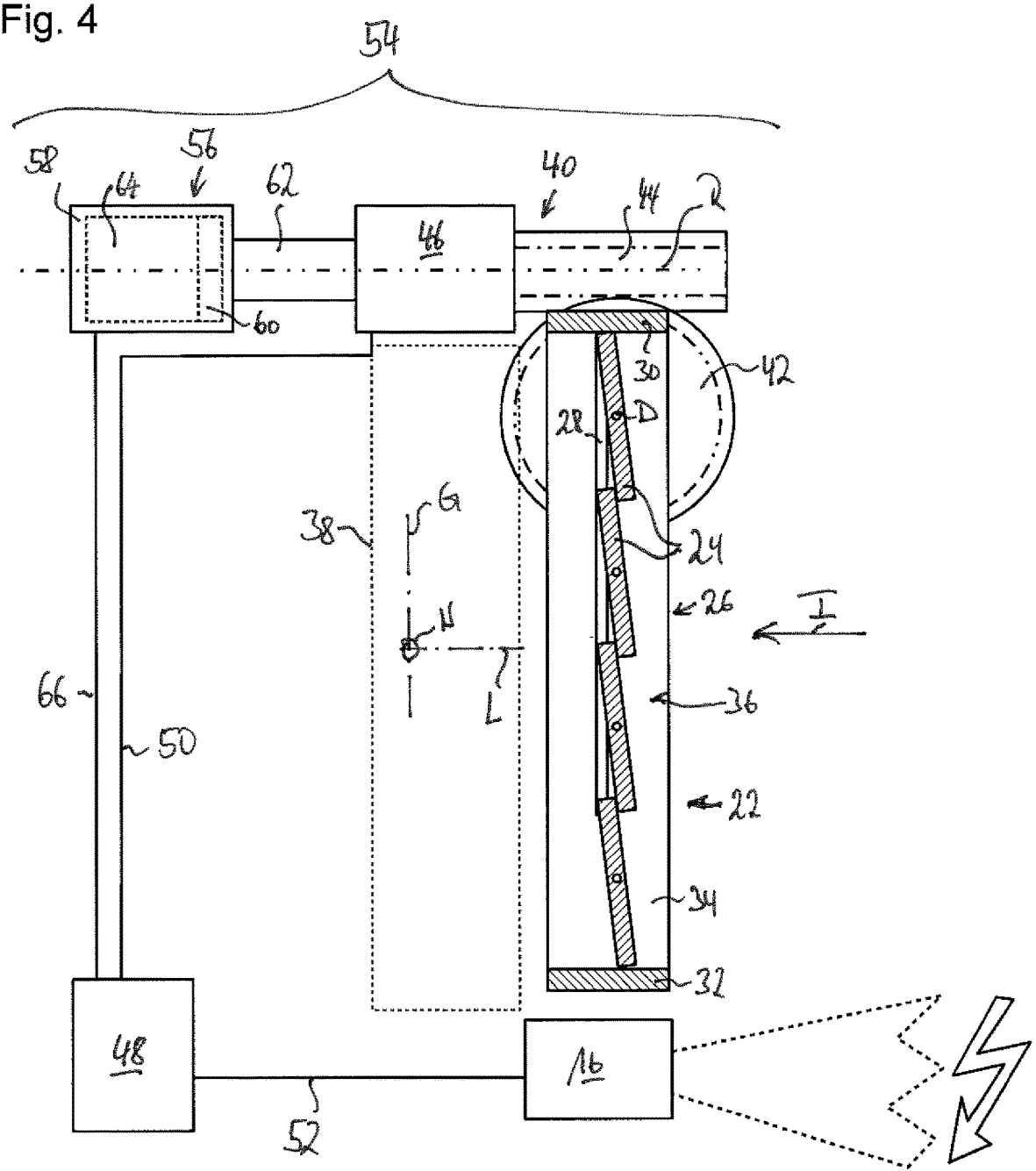
FIG. 4 depicts the invented air valve device in FIGS. 2 and 3 in emergency mode with the air valves in the blocking position.

The air valve device depicted in FIGS. 2 to 4 is not true to scale and is shown only in roughly schematic form. After its placement in the motor vehicle 10 it is oriented therein such that the vehicle's own coordinate system of roll axis L and yaw axis G is oriented parallel to the drawing plane of FIG. 2, whereas the lateral axis N of the vehicle is oriented orthogonal to the drawing plane of FIG. 2. The roll axis L runs parallel to the forward direction of driving V.

FIG. 3 shows the air valve device 20 known from FIG. 2 with air valves 24 illustrated in the flow position. The air valves 24 which are oriented in the flow position are essentially parallel to the roll axis L along their width dimension B, and their longitudinal edge inside the vehicle in the flow position extends to very near the cooler-heat exchanger 38, which is to be convectively cooled by the air flowing through the flow opening 36.

When the air valves 24 are adjusted into the flow position of FIG. 3, if the vehicle makes a frontal impact against an object during forward driving, then the object impacts in the direction of arrow I against the vehicle front, when viewed in a coordinate system with fixed air valve support.

Aside from the impact stress, the impact of an object along the arrow I against the air valve device 20 leads to a flexural stress of the air valves 24 connected on their longitudinal ends to the air valve support 26 along a flexure axis parallel to the yaw axis G. The flexure resistance of the air valves 24 in the flow setting is proportional to the area moment of inertia acting on the flexure axis parallel to the yaw axis. For air valves 24, this is proportional to the width B and thickness d ($B^3 \cdot d$). Since B is much greater than d, the air valves 24 in the flow position are much more resistant to flexure around a flexure axis parallel to the yaw axis. Firstly, this can cause severe injuries if the colliding object is a person. In addition, this can result in significant damage, for example, to the coolant-heat exchanger 38 located directly behind the air valves 24, as, on the one hand, the distance between the longitudinal edge of the air valves 24 inside the vehicle and the heat exchanger 38 is small, and on the other hand, a collision of the air valves 24 with the coolant-heat exchanger 38 also means that with a frontal collision in the flow position, these components, as very rigid objects, are at risk of significant damage or even destruction upon impact.

One possible means of counteracting this risk would be to significantly reduce the width B of the air valves 24. However, this results in an increase in the number of air valves 24, which have to be arranged in the flow opening in order to seal it off completely. Since air valves 24 provided at k in the flow opening 36 necessarily affect the configuration of the flow opening 36 itself in the flow position of the air valves 24 by k-times the thickness of one air valve, then with an increasing number of air valves 24, the maximum attainable cross-section for a given configuration of the flow opening 36 becomes increasingly smaller. Thus the preference is actually for the fewest, and therefore largest or widest air valves 24 in the flow opening 36.

The present invention thus uses the collision prediction device 16, when the collision prediction device 16 in cooperation with the control device 48 detects a high level of collision danger as is indicated in FIG. 4, to adjust the air valves 24 into the blocking position as an emergency mode target position. If the obstacle is detected as being sufficiently far in front of the vehicle—the vehicle speed naturally being taken into account here—this can occur by means of the normal mode drive unit 40, or as depicted in FIG. 4, for example, by means of the emergency mode drive unit 56, in the event that the fastest-possible adjusting of the air valves 24 should be necessary.

In the blocking position, not only is the vehicle-internal longitudinal edge of the air valve 24 (the upper, longitudinal edge in FIG. 4) farther from the coolant-heat exchanger 38, so that substantially greater deformation of the air valves 24 can occur before they make any contact with the heat exchanger 38, but much more significantly, the flexure resistance of the air valves 24 about a yaw axis parallel to the yaw axis in the blocking position shown in FIG. 4 is approximately proportional to $(B \cdot d^3)$. Since B>>d applies, the flexure resistance for the described collision-relevant stress is significantly smaller than it would be if the air valves 24 were located in the flow position. This observation is, in the present case, not entirely precise due to the residual slant positioning of the air valves 24 in the blocking position, but it does accurately reflect the magnitude of the differences in the flexural resistance.

Therefore, if the control device 48 determines—based on the signals supplied by the collision prediction device 16—that a collision is imminent, the control device 48 ignites the ignitable material in the explosion chamber 64, whereupon it expands explosively, instantly displacing the piston 60 while enlarging the volume of the explosion chamber 64. With this displacement, the piston rod 62 is pushed out, together with the normal mode drive unit 40. Thus the worm 44 is displaced translationally along the rotation axis R, so that the worm gear 42 is rotated so as to effect the closing.

Due to the sudden displacement of the air valves 24 into the closed position, the expendable emergency mode drive unit 56 will now have to be replaced.

Due to the sudden adjustment of the air valves 24 into the blocking position, the risk of injury to a person colliding with the vehicle can be reduced and the risk of damage to functional components located behind the air valves 24 can also be reduced considerably.

After actuation of the emergency mode drive unit 56, the air valve arrangement 22 can once again be displaced by the normal mode drive unit 46, which is still able to displace the worm 44 to rotate around the axis of rotation R. However, due to the one-way nature of the pyrotechnic emergency mode drive unit 56 described above, the safety feature underlying the present invention will only be available again when the spent emergency mode drive unit is replaced by a new one.

The invention claimed is:
1. Air valve device for a motor vehicle, comprising:
an air valve support with a flow opening and with at least one air valve extending into or passing through the flow opening, and which is movably seated on the air valve support between a blocking position as a first working position, and a flow position as a second working position, wherein the air valve in the blocking position provides a greater resistance to a particular flow through the flow opening than in the flow position,
a drive device which is connected to the at least one air valve as movement drive for movement between the first and second working positions of the at least one air valve, at least temporarily in a drive force transmitting manner, and
a control device to actuate the drive device,
wherein the air valve device comprises a collision prediction device which is designed such that when in the final state mounted on the motor vehicle, the collision prediction device monitors a monitored zone located in front of the vehicle and assesses the danger of collision, wherein the collision prediction device is coupled to the control device so as to transmit a signal to the control device, and wherein the control device is designed to actuate the drive device to cause the movement of the at least one air valve into a predetermined target position range when the collision prediction device emits a signal which indicates that the danger of a collision is high, so that the movement of the at least one air valve into the predetermined target position range occurs before the collision occurs.

2. Air valve device according to claim 1,
wherein the predetermined target position range is located closer to the blocking position than to the flow position.

3. Air valve device according to claim 2,
wherein the predetermined target position range contains only positions which are located more closely to the blocking position than to the flow position.

4. Air valve device according to claim 3,
wherein the target position range comprises, or in particular is, the blocking position.

5. Air valve device according to claim 1,
wherein the collision prediction device features at least one contactless sensing device for scanning the monitoring zone.

6. Air valve device according to claim 1,
wherein the control device is designed to actuate the drive device to cause movement of at least one air valve into the predetermined target position range with an emergency-drive power when the collision prediction device emits a signal which indicates that the danger of a collision is high;
wherein the control device is designed to actuate the drive device to cause movement of at least one air valve between the first and second working positions with a nominal-drive power in normal operations when the collision prediction device does not emit a signal which indicates that the danger of a collision is high; and
wherein the emergency-drive power is greater than the nominal-drive power.

7. Air valve device according to claim 1,
wherein the drive device features at least two movement drives separately operable from each other.

8. The air valve device according to claim 5, wherein the contactless sensing device is a radar, LIDAR and/or ultrasonic sensing device.

9. The air valve device according to claim 6, wherein the control device is designed to actuate the drive device to cause the movement of at least one air valve into the predetermined target position range with an emergency-drive power when the collision prediction device emits a signal which indicates that the danger of a collision is high and the emergency-drive power is greater than a multiple of the nominal drive power.

10. The air valve device according to claim 7, wherein the at least two movement drives include a normal mode drive unit for movement of the at least one air valve in nonemergency situation of the air valve device and an emergency mode drive unit for movement of the at least one air valve in an emergency-operation situation, wherein the emergency mode drive unit accelerates the at least one air valve faster and/or move the at least one air valve faster, than the normal mode drive unit.

11. Air valve device according to claim 10,
wherein the emergency mode drive unit features a mechanical and/or pneumatic and/or hydraulic and/or pyrotechnic energy store and an initiator for sudden conversion of potential energy stored in the mechanical and/or pneumatic and/or hydraulic and/or pyrotechnic energy store into movement energy of the at least one air valve.

12. Air valve device according to claim 10 or 11,
wherein the control device actuates the emergency mode drive unit to move the at least one air valve into the target position range depending on the signal from the collision prediction device.

13. Air valve device for a motor vehicle, comprising:
an air valve support with a flow opening and with at least one air valve extending into or passing through the flow opening, and which is movably seated on the air valve support between a blocking position as a first working position, and a flow position as a second working position, wherein the air valve in the blocking position provides a greater resistance to a particular flow through the flow opening than in the flow position,
a drive device which is connected to the at least one air valve as movement drive for movement between the first and second working positions at least temporarily in a drive force transmitting manner, and
a control device to actuate the drive device, wherein the control device is designed to receive signals from a collision prediction device which is designed such that when in a final state mounted on the motor vehicle, the control device monitors a monitored zone located in front of the vehicle and assesses a danger of collision, and to then, based on the signals from the collision prediction device, actuate the drive device to move the at least one air valve into a predetermined target position range when the signal from the collision prediction device indicates that the danger of a collision is high, so that the movement of the at least one air valve into the predetermined target position range occurs before the collision occurs.

14. A motor vehicle having an air valve device, said air valve device comprising:
an air valve support with a flow opening and with at least one air valve extending into or passing through the flow opening, and which is movably seated on the air valve support between a blocking position as a first working position, and a flow position as a second working position, wherein the air valve in the blocking position provides a greater resistance to a particular flow through the flow opening than in the flow position,
a drive device which is connected to the at least one air valve as movement drive for movement between the first and second working positions of the at least one air valve, at least temporarily in a drive force transmitting manner, and
a control device to actuate the drive device,
wherein the air valve device comprises a collision prediction device which is designed such that when in the final state mounted on the motor vehicle, the collision prediction device monitors a monitored zone located in front of the vehicle and assesses the danger of collision, wherein the collision prediction device is coupled to the control device so as to transmit a signal to the control device, and wherein the control device is designed to actuate the drive device to cause the movement of the at least one air valve into a predetermined target position range when the collision prediction device emits a signal which indicates that the danger of a collision is high, so that the movement of the at least one air valve into the predetermined target position range occurs before the collision occurs;
said motor vehicle comprising a vehicle control device which is connected to the control device of the air valve device so as to transmit signals, or which is the control device.

* * * * *